United States Patent [19]

Albrecht

[11] Patent Number: 5,046,582

[45] Date of Patent: Sep. 10, 1991

[54] FOLDABLE LADDER COMBINATION WITH TRUCK CARGO CARRIER

[76] Inventor: Leonard N. Albrecht, 12 Moss Glen, Irvine, Calif. 92715

[21] Appl. No.: 592,278

[22] Filed: Oct. 3, 1990

[51] Int. Cl.$^5$ .............................................. E06C 5/00
[52] U.S. Cl. ..................................... 182/127; 182/97; 280/166
[58] Field of Search .................... 182/95, 97, 163, 156, 182/127, 88, 93; 280/163, 164.1, 166; 224/273

[56] References Cited

U.S. PATENT DOCUMENTS

| | | | |
|---|---|---|---|
| 2,568,093 | 9/1951 | Smid et al. | 182/88 |
| 2,657,940 | 11/1953 | Davidson | 182/97 |
| 3,392,990 | 7/1968 | Wolf | 280/163 |
| 4,021,071 | 5/1977 | Norman | 182/97 X |
| 4,079,815 | 3/1978 | Cormier | 182/97 X |
| 4,139,078 | 2/1979 | Keller | 182/93 X |
| 4,205,862 | 6/1980 | Tarvin | 280/166 |
| 4,412,686 | 11/1983 | Fagrell | 280/166 |

Primary Examiner—Karen J. Chotkowski
Attorney, Agent, or Firm—Allan R. Fowler

[57] ABSTRACT

Disclosed is a compact folding ladder having a lower runged ladder portion, the upper end of which is pivotally connected on a horizontal axis to the lower end of a upper open dual hand-rail ladder portion whereby the lower ladder portion nests in the upper open ladder portion in the folded position and may be pivotally deployed therefrom for use. One longitudinal edge of the upper open ladder portion is pivotally mounted on a vertical pivot axis to the inboard lateral face of one of the rear edge vertical posts of a structural cargo enclosure above a cargo bed whereby the folded ladder may be pivoted forward to a stowed position and rearward to an operative position outboard of the rear end of the cargo bed thereby to facilitate deployment of the lower runged ladder portion to its open position for ladder access by the user from ground level to the rear end of the cargo bed, hence to the structural cargo enclosure.

9 Claims, 3 Drawing Sheets

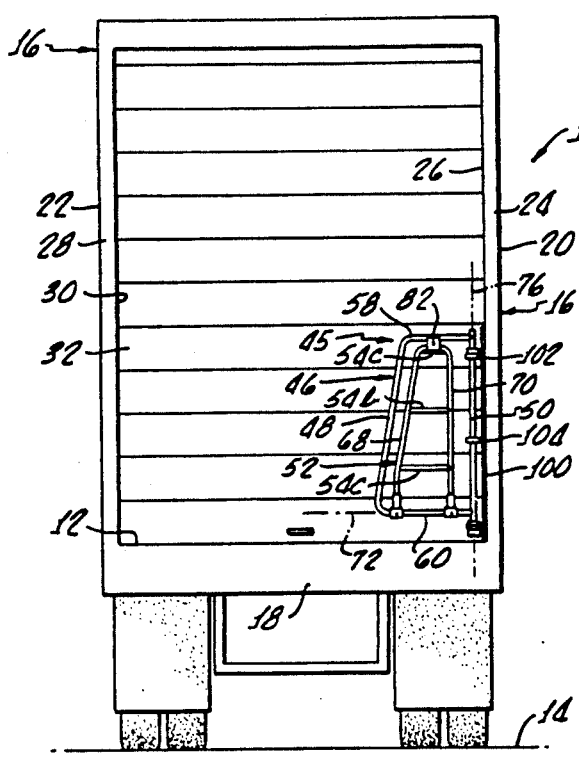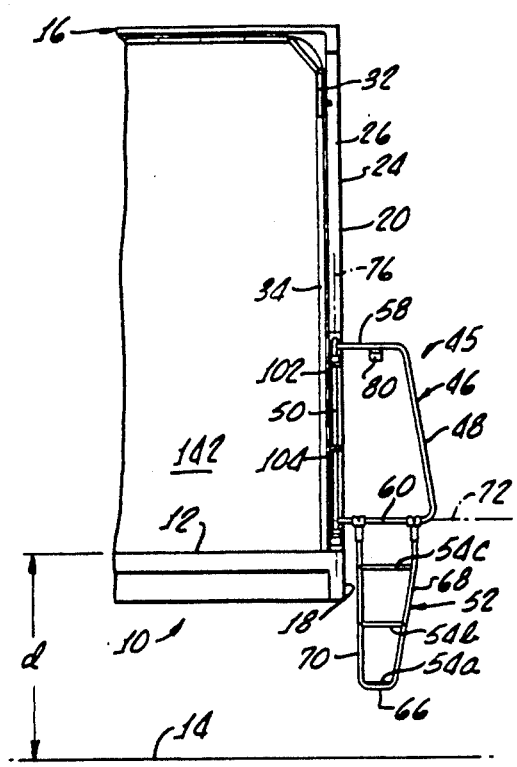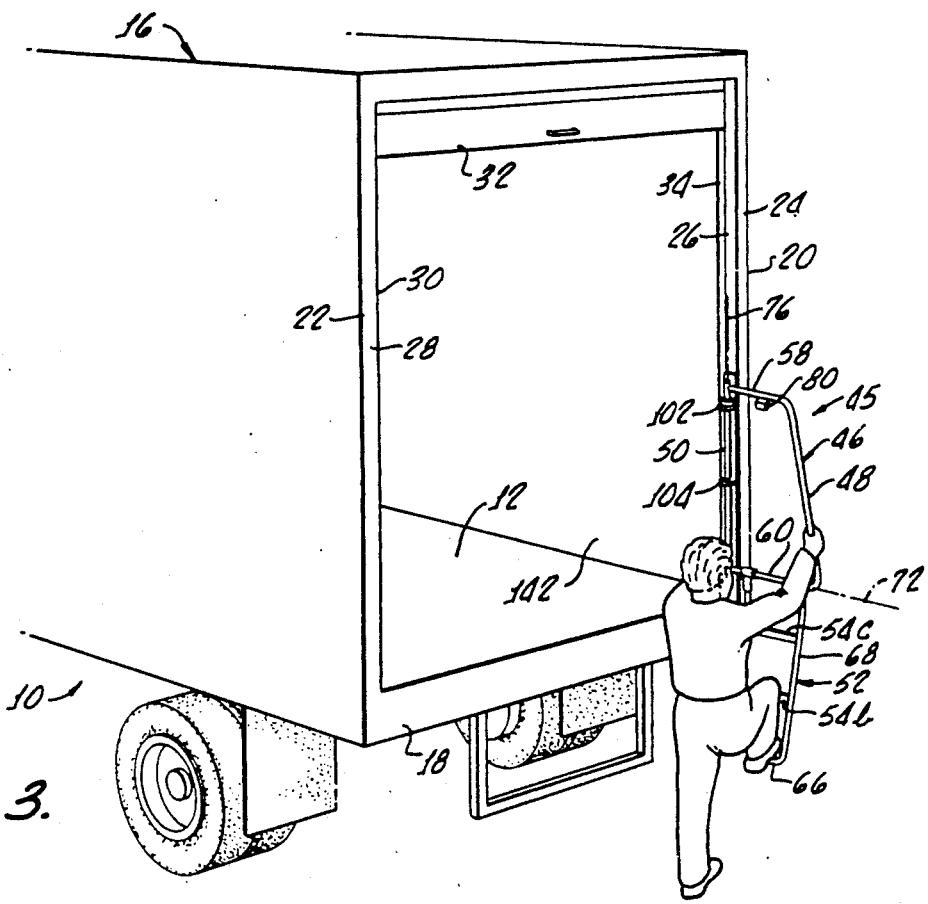

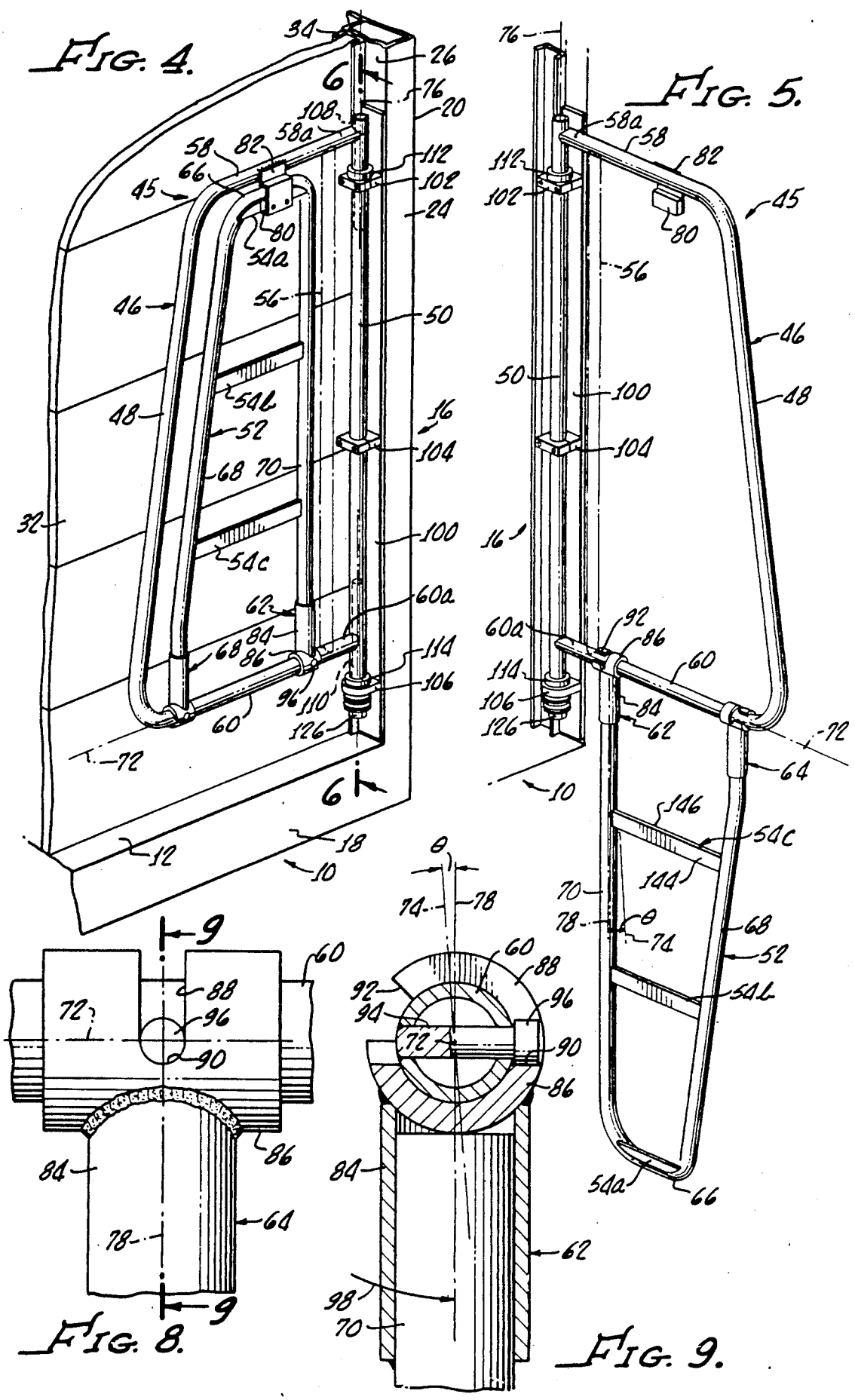

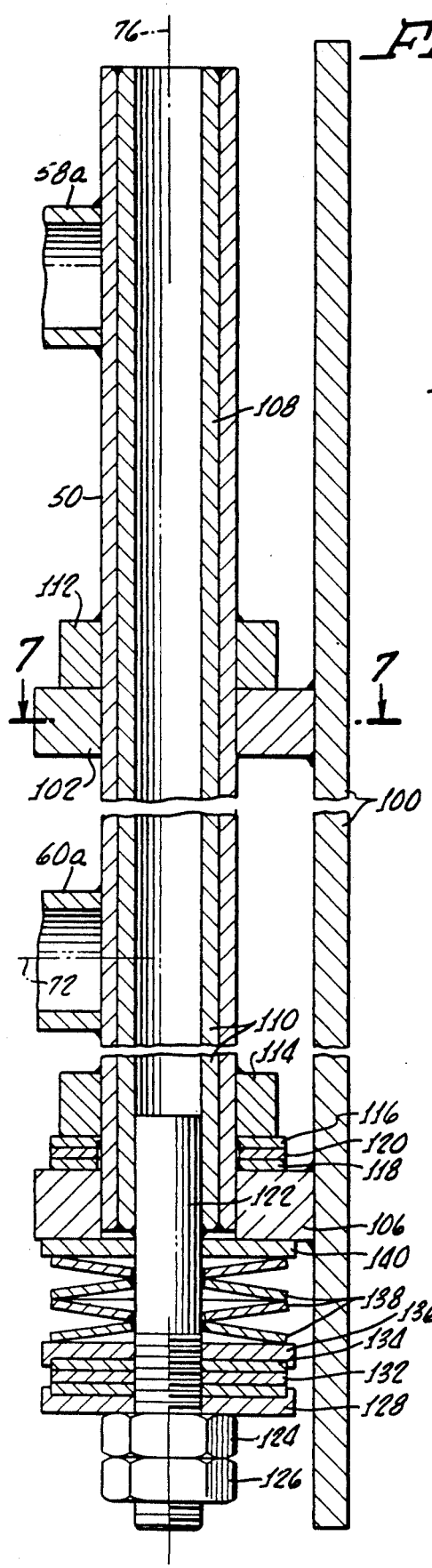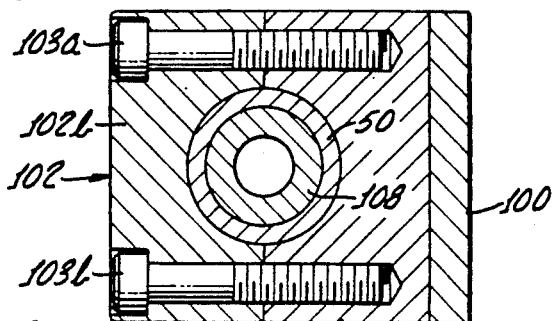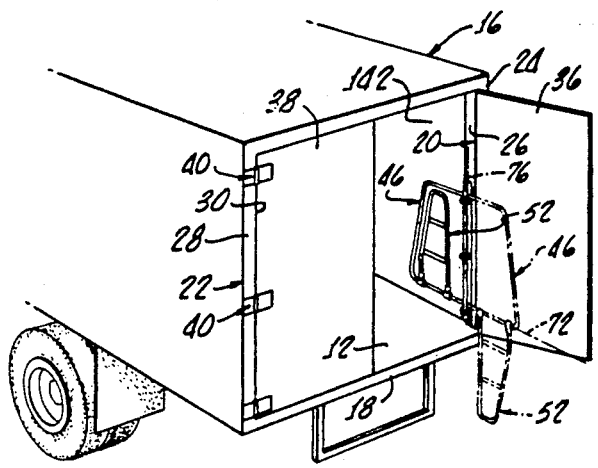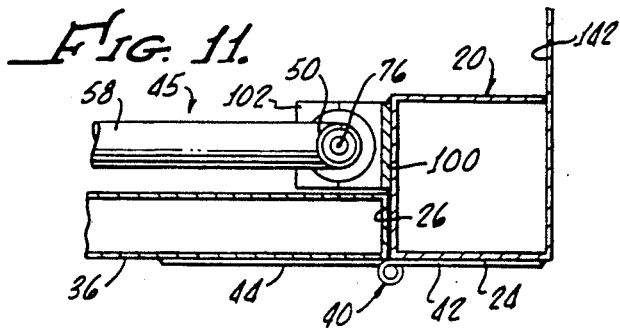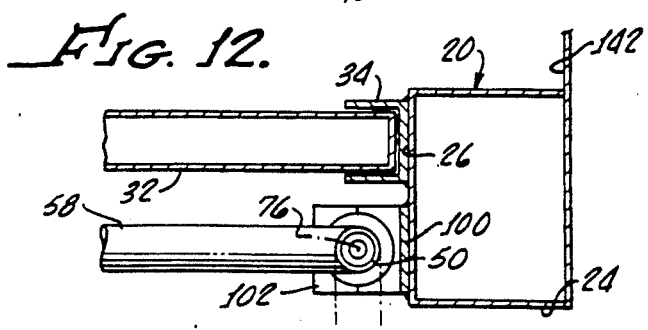

FOLDABLE LADDER COMBINATION WITH TRUCK CARGO CARRIER

This invention relates to truck cargo carriers having an elongated structural cargo enclosure extending upwardly from and substantially covering an elongated, approximately horizontal, elevated cargo bed, and has particular reference to the cooperative combination therewith of a compact folded ladder mounted thereon and conveniently deployable for access to the cargo bed through the rear door of the structural cargo enclosure.

BACKGROUND OF THE INVENTION

Commercial truckers frequently have situations arise where they require personal access to the elevated bed of the truck's cargo carrier. The cargo carrier may be mounted on the truck frame itself as in the case of a so-called bob-tail truck; or, the cargo carrier may be a trailer pulled by a truck tractor. In either case, the conventional truck cargo carrier includes an elongated approximately horizontal cargo bed elevated about four to five feet above ground level, and an elongated structural cargo enclosure extending upwardly from, and substantially covering the cargo bed. The cargo bed has a rear end from which cargo is loaded into and unloaded from the cargo carrier, and the structural cargo enclosure has at its rear end right and left side edges in the form of vertical posts extending upward from adjacent the rear end of the cargo bed, and typically has either a single "roll-up" tambour rear door which is engaged in slots disposed at the inboard lateral faces of the posts, or has a pair of swinging doors hinged to such vertical posts, for opening and closing the rear end of the structural cargo enclosure to provide loading and unloading rear access to the structural cargo enclosure and cargo bed Typically, the rear end of a truck cargo carrier is backed up to a loading dock, the elevation of which is approximately level with the elevation of the cargo bed. Under these circumstances, the trucker has reasonable access to the cargo enclosure and cargo bed by means of the loading dock. However, this is not true under many circumstances where access to the cargo enclosure at the rear end of the cargo bed is required. As a result, truckers are encouraged to climb up onto the elevated cargo bed and usually choose to jump off of it. This is inconvenient at best, and can and sometimes does lead to significant accidental personal injury to the trucker.

To attempt to alleviate this problem by having the trucker bother to carry a separate ladder and securely position it for each time access and egress from the rear end of the cargo carrier is required, is not a satisfactory solution to the problem because truckers are typically strong and agile and are tempted not to go to the trouble to use or to properly securely position such a separate ladder, assuming such ladder has not become lost, misplaced or stolen. Hence, accidents and injuries will continue to occur unnecessarily.

A better solution to this problem is reached by the present invention which contemplates a built-in folding ladder having elevated hand rails, which is mounted adjacent the rear end of the cargo enclosure above the cargo bed and is conveniently accessible and deployable to a stable position for ready access to the rear of the elevated cargo bed and structural cargo enclosure. The folded ladder is compact and is conveniently mounted for movement to a stowed position inboard of the rear end of the cargo bed where it is out of the way and poses no significant obstruction to cargo space, interference with the rear door or doors, or interference with backing of the rear end of the cargo bed against a loading dock.

So far as is known, prior truck ladders are exemplified by those illustrated in U.S. Pat. No's. 3,882,965 to Loomis, et. al.; 4,205,862 to Tarvin; 4,482,029 to Prochaska; and, 4,492,286 to Lemire. While no review has been made of other references cited in these patents, it is believed that the folding ladder combination of the present invention is unique compared to prior truck ladders, as to its structure, its features of utility, and its mounting on and cooperative combination relationships with a truck cargo carrier of the character herein described.

SUMMARY OF THE INVENTION

In accordance with the present invention, the folding ladder is disposed approximately vertically and includes an upper open ladder portion defining elevated dual hand rails, and a lower ladder portion having rungs. Both the upper open ladder portion and the lower runged ladder portion have upper and lower ends and right and left longitudinal edges. The upper end of the lower runged ladder portion is pivotally connected to the lower end of the open ladder portion for pivotal movement about a horizontal axis between a folded pivotal position for storage and an open pivotal position deployed for use.

The upper open and lower runged ladder portions are configured so that the lower runged ladder portion nests in the upper open ladder portion between the dual hand rails thereof in the folded pivotal position. Means are provided for releasably retaining the lower runged ladder portion in the folded pivotal position; and, means are provided for limiting the open pivotal position of the lower runged ladder portion about the horizontal axis with respect to the upper open ladder portion.

Means are provided for mounting the upper open ladder portion to the structural cargo enclosure at a position disposed above the rear end of the cargo bed and proximate a juncture of a rear door thereof with one side edge of the strucutral cargo enclosure, with the upper open ladder portion being disposed approximately vertically and with the lower end of the upper open ladder portion being disposed above, but proximate to the same elevation as the cargo bed; e.g., about six inches.

In the preferred embodiment of the invention, the upper open ladder portion has support members connected at or adjacent one of the longitudinal edges thereof; pivot means are mounted to the structural cargo enclosure and define an approximately vertical pivot axis;and the support members are pivotally mounted to such pivot means, whereby the ladder in the folded position may be pivoted about the vertical pivot axis forwardly toward the cargo enclosure to a stable stowed position, and whereby the ladder in the folded position may be pivoted about the vertical pivot axis rearwardly away from the cargo enclosure to a stable position outboard of the rear end of the cargo bed to facilitate the lower runged ladder portion to be in turn pivoted about the horizontal pivot axis and deployed to its open position for ladder access by the user from ground level to the elevated cargo bed.

Preferably, the pivot means defining the vertical pivot axis is mounted on the inboard lateral face of one of the right and left vertical posts defining the right and left side edges of the structural cargo enclosure adjacent the rear end of the cargo bed, with the vertical pivot axis being disposed forward of the rear extremity of the post sufficient to accommodate the folded ladder forward of such extremity in the forward stowed position.

BRIEF DESCRIPTION OF THE DRAWINGS

The foregoing and other significant features of the present invention are more fully described and explained in the following detailed description of preferred embodiments thereof made with reference to the accompanying drawings, in which:

FIG. 1 is a rear elevation of a truck cargo carrier having a roll-up tambour rear door and illustrating the mounting thereon and combination therewith of the folding ladder shown in its folded and stowed position, in accordance with a preferred embodiment of the invention;

FIG. 2 is a fragmentary side view, partially in section, of the rear end of the truck cargo carrier of FIG. 1 showing the folding ladder in its outboard position with the lower runged portion thereof deployed to its open pivotally unfolded position toward ground level, and with the roll-up rear door open;

FIG. 3 is a fragmentary rear perspective view of the truck cargo carrier of FIG. 1 with the roll-up door and folding ladder deployed in the same position as illustrated in FIG. 2 and further illustrating the trucker or other user beginning to ascend the deployed ladder to access the open cargo enclosure;

FIG. 4 is a fragmentary perspective view better illustrating the details, including the mounting details, of another preferred embodiment of the invention showing the folding ladder in its folded and stowed position mounted on the right rear post of the structural cargo enclosure of the truck cargo carrier of FIG. 1, the folding ladder being the same as that shown in FIG. 1 but for the addition of a separate left hand rail shown in phantom line;

FIG. 5 is a view similar to FIG. 4 but for the folding ladder being pivoted to its outboard and deployed position, and further illustrating the deployed open pivotal position of the runged ladder portion being only about 175° from its folded pivotal position whereby the lower runged portion of the ladder going from upper to lower end extends slightly toward the user;

FIG. 6 is an elevation, partly cut away and partly in section, taken along line 6—6 of FIG. 4 illustrating the pivot means and pivotal connections between the pivot means and the left longitudinal edge of the upper open ladder portion, and also illustrating the means for controlling frictional forces opposing pivotal movement about the vertical axis between the stowed and outboard position;

FIG. 7 is a view partly in section taken along line 7—7 of FIG. 6 and illustrating a split bearing as part of the pivot means and pivotal connection of the left longitudinal edge of the upper open ladder portion thereto;

FIG. 8 is a fragmentary elevation illustrating one of two typical pivotal connections between the upper end of the lower runged ladder portion and the lower end of the upper open ladder portion about a horizontal axis, also serving as a means for limiting the open pivotal position of the lower runged ladder portion about the horizontal axis;

FIG. 9 is a view partly in section taken along line 9—9 of FIG. 8, better illustrating the means for limiting the open pivotal movement of the lower runged ladder portion about the horizontal axis;

FIG. 10 is a rear perspective fragmentary elevation of a truck cargo carrier having a pair of hinged rear doors mounted to its structural cargo enclosure and illustrating the mounting and deployment of the folding ladder relative thereto in the stowed and outboard positions with the right rear door shown in the open position and with the outboard and deployed ladder position shown in phantom line, the folded and stowed position being shown as pivoted against an interior side wall of the structural cargo enclosure;

FIG. 11 is a fragmentary sectional view of the right rear corner of the structure shown in FIG. 10, looking downwardly, but illustrating the hinged door in the closed position and the stowed position of the folded ladder as being parallel to the closed hinged door adjacent the interior side thereof; and, FIG. 12 is a fragmentary sectional view looking downward taken at the right rear corner of FIG. 1 and illustrating the stowed pivotal position of the folded ladder (with outboard position illustrated by phantom line) in relation to a closed roll-up door and the right rear vertical post of the structural cargo carrier.

DETAILED DESCRIPTION

Referring now to the drawings, particularly FIGS. 1 thru 5, a truck cargo carrier 10 includes an elongated approximately horizontal cargo bed 12 elevated by a substantial distance d of about 4 to 5 feet above ground level 14, and also includes an elongated structural cargo enclosure 16 which extends upwardly from and substantially covers the cargo bed 12. The cargo bed has a rear end 18 from which cargo is loaded into and unloaded from the cargo carrier. The structural cargo enclosure has right and left side edges, respectively defined by right and left vertical posts 20, 22, extending vertically upward from adjacent the rear end of the cargo bed. These vertical posts are frame members of the structural cargo enclosure. Typical of both posts, the right vertical post 20 has a rear extremity in the form of a rear face 24 and also has an inboard lateral face 26. Correspondingly, the left vertical post 22 has a rear extremity 28 and an inboard lateral face 30.

The structural cargo enclosure has a rear roll-up or tambour door 32 disposed in its closed position in FIGS. 1, 4 and 12 and disposed in its open position in FIGS. 2, 3 and 5.

As best seen in FIGS. 1, 2, 4 and 12, the roll-up tambour door adjoins vertical side edges of the structural cargo enclosure as defined by the right and left rear vertical posts 20, 22. As shown typically for the right rear post 20, this juncture is by engagement of the right edge of the tambour door 22 in an open channel 34 extending along the interior edge of the inward lateral face 26 of the right post 20 and curving upwardly overhead toward the interior of the enclosure.

Alternatively, as shown in FIGS. 10 and 11, the structural cargo enclosure may have right and left rear doors 36, 38 which are pivotally hinged to the right and left posts 20, 22 at or adjacent the rear extremities 24, 28 of the respective vertical posts, so that either the right or left hinged rear door, or both, can be open and shut to afford access to the rear end of the cargo carrier. A typical vertical axis hinge connection 40 for the right swinging door is illustrated in FIG. 11 where the hinge connection includes right and left hinge leaves 42, 44 respectively connected as by welding to the rear extremity 24 of the face, right post 20 and to the exterior right margin of the right swinging door 36.

Referring now to FIGS. 1 thru 5, a folding ladder 45 is disposed approximately vertically and includes an elongated upper open ladder portion 46 defining elevated dual hand rails, a right hand rail 48 and a left hand rail 50, which extend well above the cargo bed to assist safe access and egress by the user. The folding ladder also includes an elongated lower ladder portion 52 having a plurality of horizontal rungs 54a, 54b and 54c, beginning with the lower rung 54(a).

Since the left hand rail 50 also serves as a vertical pivot post and is crowded near the inboard lateral face 26 of the right rear post 20 of the structural cargo enclosure, it may be desirable and is contemplated that a separate left hand rail, shown in phantom line and designated 56, be added in proximate parallel relationship to the pivot post 50, as illustrated in FIGS. 4 and 5.

The upper open ladder portion 46 has an upper end 58, a lower end 60 and right and left longitudinal edges provided by the right and left hand rails 48, 50, or 48, 56, depending upon whether a hand rail function is to be accorded to the pivot post 50. The lower runged ladder portion 52 has an upper end defined by a pair of pivot fittings 62, 64, a lower end 66 proximate the lower rung 54a and has right and left longitudinal edges 68, 70.

The pivot fittings 62, 64, defining the upper end of the lower runged ladder portion pivotally engage the lower end 60 of the upper open ladder portion 46 for pivotal movement about a horizontal axis 72 between a folded pivotal position for storage (FIG. 4) and an open pivotal position deployed for use (FIG. 5). As seen in FIG. 5, the open or deployed pivotal position is less than 180° from the folded position about the horizontal axis 72 by an amount equal to the angle θ of about 5° to 10°. The construction line 74 shown in FIGS. 5 and 9 indicates the vertical, it being noted that the axis 76 of the pivot post 50 also is vertical and is a pivot axis, whereas the construction line 78 is the center line of the member 70 defining the left longitudinal edge of the lower runged ladder portion 52.

As best seen in FIGS. 4 and 5, a permanent magnet 80 is supported by a bracket 82 welded to the upper member 58 of the upper open ladder portion 46 so that when the lower runged ladder portion 52 is pivoted upwardly about the horizontal pivot axis 72, the lower rung 54(a) engages the magnet 80 for releasably retaining the lower runged ladder portion in the folded pivotal position, with the upper open and lower runged ladder portions 46, 52 being configured so that the lower between the dual hand rails thereof in the folded pivoted position.

As best illustrated in FIGS. 4, 5, 8 and 9, each pivot fitting, as typified by the left pivot fitting 62, has a lower longitudinal collar 84, the center line of which is illustrated at 78, welded to an upper transverse collar 86, the center line of which is the horizontal pivot axis 72. The upper end of a member 70 defining the left longitudinal edge of the lower runged ladder portion is inserted into the longitudinal collar 84 and is welded thereto. The transverse collar 86 has a circumferential open slot 88 formed therein, one end of which 90 acts as a stop. The transverse collar 86 also has an open longitudinal slot 92 extending from the circumferential slot 88 and opening at one end of the collar 86 for assembly purposes. A steel pin 94 having an enlarged head 96 extends through the member 60 defining the lower end of the upper open ladder portion and is welded thereto. When the lower runged ladder portion is pivoted about the horizontal pivot axis from its folded to its open position in the direction of the arrow 98 (FIG. 9), the stop 90 will be brought into contact with the enlarged head 96 of the steel pin 94, thereby limiting the open position of the lower runged ladder portion to about 170° to 175° from the vertical folded position as indicated by the angle θ of about 5° to 10° between the vertical construction line 74 and the center line 78 of the member 70. The construction of the right pivot fitting 64 and its cooperation with the lower member 60 of the upper open ladder portion is similar, providing both the pivot function about the horizontal axis 72 as well as the limiting stop function for open pivotal movement.

As a result, the lower runged ladder portion in its open deployed position extends slightly toward the user going from the upper to the lower end thereof and thereby counters any tendency for the lower runged ladder portion to pivot further in the same direction tending to carry the user under the upper open ladder portion when the user first steps on the lower rung 54(a) of the ladder.

The upper open ladder portion 46 is mounted to the structural cargo enclosure 16 at a position disposed above the cargo bed 12 and adjacent the juncture of the rear door with one side edge of the structural cargo enclosure. As best seen in FIGS. 4 thru 6, this is preferably accomplished by welding an elongated narrow steel plate 100 to an available portion of the inboard lateral face 26 of the right rear vertical post 20. The steel plate 100 has upper and middle split bearings 102, 104 as well as a lower journal 106 welded thereto in alignment on and defining the vertical pivot axis 76, this structure providing a pivot means about the vertical pivot axis 76.

The pivot post 50, together with extensions 58(a) and 60(a) of the upper and lower members 58, 60, which extensions are welded to the pivot post 50, together constitute support members connected to the upper open ladder portion at or adjacent the left longitudinal edge thereof and further together act as a means for pivotally mounting the upper open ladder portion to the pivot means provided by the steel plate 100, bearings 102, 104 and journal 106. The pivot post 50 is rotatably journaled in the split bearings 102, 104 and lower journal 106. The post 50 has an upper internal reinforcing member 108 inserted therein and welded thereto and a lower internal reinforcing member 110 inserted therein and welded thereto.

An upper exterior steel collar 112 is welded to the pivot post 50 at a position where it gently rests on the upper surface of the upper split bearing 102. A lower external steel collar 114 is welded to the pivot post 50 and cooperates with the lower journal 106 to compress between it and the lower journal upper and lower steel thrust washers 116, 118 (FIG. 6) between which is disposed a fiber friction washer 120.

A steel bolt 122 having a lower threaded end is inserted interiorly into the lower open end of the lower internal reinforcing member 110 and welded thereto. A thrust nut 124 and companion lock nut 126 are threaded onto the lower end of the steel bolt 122.

Disposed between the thrust nut 124 and the lower face of the journal 126 is a lower cup-shaped steel washer 128, a steel thrust washer 130, a fiber friction washer 132, a second steel thrust washer 124, an upper inverted cup-shaped steel washer 136, a series of ring springs 138 and an upper steel washer 140, this assemblage being compressed against the underside of the lower journal 106 by tightening the thrust nut 124.

Tightening of the thrust nut 124 pulls the lower collar 114 downwardly to compress the fibrous washer 120 between the steel thrust washers 116, 118 located between the lower collar 114 and the upper face of the journal 106, which compression largely controls the frictional force exerted in opposition to turning of the pivot post 50 about the vertical pivot axis 76, most significantly by the frictional forces exerted by the upper and lower surfaces of the fibrous washer 120 in slipping. The lower fibrous washer 132 also tends to slip as the lower cupped shape washer 128 is turned by engagement with the thrust nut 124 as a result of the bolt 122 turning with pivotal movement of the pivot post 50 so as to discourage relative movement and undue score and wear between the nut 124 and the cup shaped washer 128. Tightening of the nuts 124, 126 directly increases the frictional forces exerted by the faces of the fibrous washers 120, 132, and provides an adjustment as these fibrous washers wear through usage. The upper collar 112 is located sufficiently above the upper bearing 102 so as not to interfere.

The pivotal mounting of the upper ladder portion on the vertical axis 76 through the means above described permits the ladder in the folded position to be pivoted about the vertical pivot axis toward the cargo enclosure to a stowed position (e.g., FIG. 4), and to be pivoted rearwardly away from the cargo enclosure to a position outboard of the rear end 18 of the cargo bed 12 to facilitate the lower runged ladder portion 52 to be in turn pivoted about the horizontal pivotal axis 72 and deployed to its open position (e.g., FIG. 5) for ladder access from ground level to the elevated cargo bed. The nuts, ring springs and various washers in combination with the lower collar 114 and journal 106, as above described, provide a means for adjusting frictional forces opposing pivotal movement of the ladder about the vertical axis so as to stabilize the pivotal position of the ladder in both its stowed and outboard positions.

Referring to FIG. 7, the upper and middle split bearings 102, 104 are typified by the details illustrated for the upper split bearing 102. Typically, each split bearing 102 has a fixed base half 102(a) welded to the steel plate 100, and a removable outer half 102(b), the split bearing halves 102(a) and 102(b) being held together by a pair of machine screws 103(a), 103(b) so as to journal the pivot rod 50. The bearings are split with removable outer halfs in order to facilitate assembly and mounting, and if necessary removal, repair and remounting of the ladder to the pivot means mounted on the structural cargo enclosure.

As seen in FIGS. 10 and 11, typically there is ample room disposed on the inboard lateral face 26 of the rear vertical post 20, forward of the hinged swinging door 36, to accommodate mounting thereto of the pivot means with the vertical pivot axis 76 disposed well forward of the rear extremity 24 of the post 20. For a tambour roll-up door 32 as illustrated for example in FIGS. 4 and 12, there is ample room for mounting the pivot means on the inboard face 26 of the post 20 exteriorly rearward of the door 32 with the vertical pivot axis 76 nevertheless disposed sufficiently forward of the rear extremity 24 of the vertical post sufficient to accommodate the folded ladder 44 forward of the rear extremity 24 in the ladder's stowed position.

Referring to FIG. 10, the folded ladder's stowed position (illustrated in solid line) is shown to be pivoted forward about the vertical pivot axis 76 so that the folded ladder rests against an interior side wall 142 of the structural cargo enclosure 16, with the outboard position of the ladder being illustrated in phantom line. It should be noted that the pivot means defining the vertical pivot axis 76 could be mounted to a suitable stand-off bracket (not shown) connected to the interior side wall 142 of the structural cargo enclosure at a position closely adjacent the juncture of the swinging door 36 with the vertical post 20. By the same token, it is also possible to mount the pivot means adjacent such juncture by mounting the pivot means to the interior side of the rear swinging door 36. However, the preferred mounting is as illustrated in FIG. 11, directly to the inboard lateral face 26 of the post 20 with the stowed position of the folded ladder 44 being immediately forward in proximate parallel relationship to the rear swinging door 36 when the door is in its closed position.

As best illustrated in FIGS. 4 thru 9, the principal frames of the upper open and lower runged ladder portions are constructed of bent and welded steel tubing. However, the rungs of the lower runged ladder portion are flat steel bars of elongated rectangular cross section, welded to the tubular members 68, 70, defining the right and left longitudinal edges of the lower ladder portion 52 with the wide or elongated dimension of the cross section paralleling the longitudinal edges 68, 70 as typically illustrated by the front face 144 of the upper rung 54(c) in FIG. 5, and with the narrow dimension of the rectangular cross section being transverse to the direction paralleling the longitudinal edges 68, 70 so as to provide step surfaces for the user as typically illustrated by the upper edge 146 of the upper rung 54 c (FIG. 5) which may be formed with teeth or serrations (not shown) for traction. This configuration of the rungs allows them to be disposed substantially within the confines of the longitudinal edge members 68, 70, facilitates the nesting relationship of the lower runged ladder portion with the upper open ladder portion, provides good traction for the user and adequate strength to resist forces in the vertical or near vertical direction.

As seen, for example, in FIGS. 3 to 5, the longitudinal edge member 70 of the lower runged ladder portion disposed most proximate to the vertical pivot axis 76 extends approximately vertical, with the other or distal longitudinal edge member 68 being convergent toward the proximal longitudinal edge member 70 going from the upper to the lower end of the lower runged ladder portion so as to cause the user to first step on the lowermost rung of the ladder at a position more nearly coincident with the vertical pivot axis when ascending the deployed ladder. This assists the user and better balances the forces on the ladder.

Correspondingly, the longitudinal edge member 50 of the upper open ladder portion disposed most proximate to the vertical pivot axis 76 is vertical, with the distal longitudinal edge member 48 being convergent toward the proximal longitudinal edge member 50 in the upward direction such that the upper open ladder portion is relatively wide at its lower end 60 and narrows going from its lower to its upper end. This configuraton facilitates guidance of the user in ascending the deployed ladder and because of the long lever arm thereby provided at the lower end of the open ladder portion facilitates the user pivoting the ladder about the vertical axis 76 between its stowed and outboard positions.

I claim:

1. In combination with a truck cargo carrier, said truck cargo carrier including an elongated approximately horizontal cargo bed elevated a substantial distance above ground level, and an elongated structural cargo enclosure extending upwardly from and substantially covering said cargo bed, said cargo bed having a rear end from which cargo is loaded into and unloaded from the cargo carrier, and said structural cargo enclosure having right and left side edges extending approximately vertically upward from adjacent the rear end of the cargo bed, and at least one rear door adjoining at least one of said vertical side edges for providing loading and unloading rear access to the structural cargo enclosure and cargo bed, the improvement which comprises:

(a) a folding ladder disposed approximately vertically and including an elongated upper open ladder portion defining elevated dual hand rails, and an elongated lower ladder portion having rungs;

(b) the upper open ladder portion and the lower runged ladder portion both having upper and lower ends and right and left longitudinal edges;

(c) means pivotally connecting the upper end of the lower runged ladder portion to the lower end of the upper open ladder portion for pivotal movement about an approximately horizontal axis between a folded pivotal position for storage and an open pivotal position deployed for use;

(d) said upper open and lower runged ladder portions being configured so that the lower runged ladder portion nests in the upper open ladder portion between the dual hand rails thereof in the folded pivotal position;

(e) means for releasably retaining the lower runged ladder portion in the folded pivotal position;

(f) means for limiting the open pivotal position of the lower runged ladder portion; and, (g) means for mounting the upper open ladder portion to the structural cargo enclosure for movement inboard and outboard of the rear end of the cargo bed at a position adjacent said juncture of the rear door and said one vertical side edge of the structural cargo enclosure, with the upper open ladder portion being disposed approximately vertically and with the lower end of the upper open ladder portion being disposed above but proximate to the same elevation as the cargo bed, whereby the folded ladder may be moved inboard of the rear end of the cargo bed to a stable stowed position and outboard of the rear end of the cargo bed to a stable position for pivotal deployment of the lower runged ladder portion, so as to facilitate access and egress by the user to and from the elevated cargo bed respecting ground level with the assistance of the elevated hand rails of the upper open ladder portion.

2. In combination with a truck cargo carrier, said truck cargo carrier including an elongated approximately horizontal cargo bed elevated a substantial distance above ground level, and an elongated structural cargo enclosure extending upwardly from and substantially covering said cargo bed, said cargo bed having a rear end from which cargo is loaded into and unloaded from the cargo carrier, and said structural cargo enclosure having right and left side edges extending approximately vertically upward from adjacent the rear end of the cargo bed, and at least one rear door adjoining at least one of said vertical side edges for providing loading and unloading rear access to the structural cargo enclosure and cargo bed, the improvement which comprises:

(a) a folding ladder disposed approximately vertically and including an upper open ladder portion having dual hand rails, and a lower ladder portion having rungs;

(b) the upper open ladder portion and the lower runged ladder portion both having upper and lower ends and right and left longitudinal edges;

(c) means pivotally connecting the upper end of the lower runged ladder portion to the lower end of the upper open ladder portion for pivotal movement about an approximately horizontal axis between a folded pivotal position for storage and an open pivotal position deployed for use;

(d) said upper open and lower runged ladder portions being configured so that the lower runged ladder portion nests in the upper open ladder portion between the dual hand rails thereof in the folded pivotal position;

(e) means for releasably retaining the lower runged ladder portion in the folded pivotal position;

(f) means for limiting the open pivotal position of the lower runged ladder portion; and, (g) means for mounting the upper open ladder portion to the structural cargo enclosure above the cargo bed and adjacent said juncture of the rear door with said one side edge of the structural cargo enclosure, with the upper open ladder portion being disposed approximately vertically and with the lower end of the upper open ladder portion being disposed above but proximate to the same elevation as the cargo bed;

(h) said means for mounting the upper open ladder portion to the structural cargo enclosure comprising:

(1) pivot means mounted to the structural cargo enclosure and defining an approximately vertical pivot axis;

(2) support members connected to the upper open ladder portion at or adjacent one of said longitudinal edges thereof; and, (3) means including said support members for pivotally mounting said upper open ladder portion to said pivot means, whereby the ladder in the folded position may be pivoted about said vertical pivot axis forwardly toward the cargo enclosure to a stable stowed position, and whereby the ladder in the folded position may be pivoted about said vertical pivot axis rearwardly away from the cargo enclosure to a stable position outboard of the rear end of the cargo bed to facilitate the lower runged ladder portion to in turn be pivoted about said horizontal pivot axis and deployed to its open position, for ladder across by the user from ground level to said elevated cargo bed.

3. The apparatus of claim 2, wherein said right and left side edges of the structural cargo enclosure comprise right and left vertical posts, each having a rear extremity and an inboard lateral face; and, wherein the pivot means defining the vertical pivot axis is mounted on the inboard lateral face of one of said posts at a position where said vertical pivot axis is disposed forward of the rear extremity of the post sufficient to accommodate the folded ladder forward of said rear extremity in the forwardly pivoted stowed position.

4. The apparatus of claim 3, wherein the upper open and lower runged ladder portions each have a principal frame defining at least the right and left longitudinal edges thereof, which principal frames are constructed of steel tubing; and, wherein the rungs of the lower runged ladder portion are steel bars of approximately rectangular cross-section, said rectangular cross-section being elongated in the direction paralleling the longitudinal edges of the lower- runged ladder portion, with the narrow dimension of the rectangular cross-section being transverse thereto so as to provide step surfaces for the user.

5. The apparatus of claim 4, wherein said means for releasably retaining the lower runged ladder portion in the folded position comprises a permanent magnet for releasably joining the lower end of the lower runged ladder portion with the upper end of the upper open ladder portion.

6. The apparatus of claim 2, wherein said means pivotally mounting the support members to the pivot means includes means for adjusting frictional forces opposing pivotal movement of the folded ladder about said vertical pivot axis so as to stabilize the pivotal position of the ladder about said vertical pivot axis in its stowed and outboard positions.

7. The apparatus of claim 2, wherein the longitudinal edge of the lower runged ladder portion disposed most proximate to the vertical pivot axis, is approximately vertical; and, wherein the other longitudinal edge of the lower runged ladder portion is convergent toward said vertical longitudinal edge whereby the lower runged ladder portion narrows going from its upper to its lower end so as to cause the user to first step on the lowermost rung of the ladder at a position more nearly coincident with said vertical pivot axis.

8. The apparatus of claim 7, wherein the longitudinal edge of the upper open ladder portion disposed most proximate to the vertical pivot axis is approximately vertical; and, wherein the other longitudinal edge of the upper open ladder portion is convergent toward said vertical longitudinal edge whereby the upper open ladder portion is relatively wide at its lower end and narrows going from its lower to its upper end, so as to facilitate deployment and use of the ladder.

9. The apparatus of claim 2, wherein the means for limiting the open pivotal position of the lower runged ladder portion about said horizontal axis limits such open position to about 170° to 175° about said horizontal axis from said folded position, whereby the lower runged portion of the ladder in the open position extends slightly toward the user going from the upper to the lower end thereof.

* * * * *